United States Patent
Inoue et al.

(10) Patent No.: US 10,483,531 B2
(45) Date of Patent: *Nov. 19, 2019

(54) NEGATIVE ELECTRODE ACTIVE MATERIAL FOR NONAQUEOUS ELECTROLYTE SECONDARY BATTERIES

(71) Applicant: Mitsui Mining & Smelting Co., Ltd., Tokyo (JP)

(72) Inventors: Daisuke Inoue, Ageo (JP); Yanko Marinov Todorov, Ageo (JP); Shinya Kagei, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 234 days.

This patent is subject to a terminal disclaimer.

(21) Appl. No.: 14/412,854

(22) PCT Filed: Jul. 8, 2013

(86) PCT No.: PCT/JP2013/068597
§ 371 (c)(1),
(2) Date: Jan. 5, 2015

(87) PCT Pub. No.: WO2014/007393
PCT Pub. Date: Jan. 9, 2014

(65) Prior Publication Data
US 2015/0194669 A1    Jul. 9, 2015

(30) Foreign Application Priority Data
Jul. 6, 2012   (JP) .................................. 2012-152128

(51) Int. Cl.
| | |
|---|---|
| H01M 4/36 | (2006.01) |
| H01M 4/134 | (2010.01) |
| H01M 4/587 | (2010.01) |
| H01M 4/38 | (2006.01) |
| H01M 4/62 | (2006.01) |
| H01M 10/052 | (2010.01) |
| H01M 4/583 | (2010.01) |

(52) U.S. Cl.
CPC ........... *H01M 4/366* (2013.01); *H01M 4/134* (2013.01); *H01M 4/364* (2013.01); *H01M 4/386* (2013.01); *H01M 4/583* (2013.01); *H01M 4/587* (2013.01); *H01M 4/622* (2013.01); *H01M 4/625* (2013.01); *H01M 4/626* (2013.01); *H01M 10/052* (2013.01); *H01M 2220/20* (2013.01); *H01M 2220/30* (2013.01); *Y02T 10/7011* (2013.01)

(58) Field of Classification Search
None
See application file for complete search history.

(56) References Cited

U.S. PATENT DOCUMENTS

| | | | | |
|---|---|---|---|---|
| 9,478,800 | B2* | 10/2016 | Inoue | H01M 4/134 |
| 2008/0166474 | A1 | 7/2008 | Deguchi et al. | |
| 2010/0092857 | A1* | 4/2010 | Phillips | H01M 4/244 |
| | | | | 429/164 |
| 2011/0097627 | A1* | 4/2011 | Watanabe | B82Y 30/00 |
| | | | | 429/206 |
| 2011/0274982 | A1* | 11/2011 | Kaneko | H01M 4/133 |
| | | | | 429/303 |
| 2012/0077083 | A1* | 3/2012 | Kageura | H01M 4/131 |
| | | | | 429/211 |
| 2012/0156555 | A1* | 6/2012 | Hojo | H01M 4/131 |
| | | | | 429/188 |

FOREIGN PATENT DOCUMENTS

| | | |
|---|---|---|
| JP | 11-250896 | 9/1999 |
| JP | 11-354104 | 12/1999 |
| JP | 2000-285919 | 10/2000 |
| JP | 2005-293942 | 10/2005 |
| JP | 2008-210618 | 9/2008 |
| JP | 2010157405 | 7/2010 |
| JP | 2010-170878 | 8/2010 |
| JP | 2011-100745 | 5/2011 |
| JP | 2012-124057 | 6/2012 |
| WO | 0181033 A1 | 1/2001 |
| WO | 2007094240 | 8/2007 |

OTHER PUBLICATIONS

Tabuchi (JP, 2011-100745) (a raw machine translation) (Abstract and Detailed Description) (May 19, 2011).*

* cited by examiner

*Primary Examiner* — Carmen V Lyles-Irving
(74) *Attorney, Agent, or Firm* — The Webb Law Firm

(57) ABSTRACT

Proposed is a novel negative electrode for nonaqueous electrolyte secondary batteries in which the battery capacity does not decrease even when charging and discharging are repeated. Proposed is a silicon-containing negative electrode active material for nonaqueous electrolyte secondary batteries, comprising negative electrode active material particles which are provided with a surface layer containing carbon and titanium or aluminum on the entirety or a portion of the surface of the active material.

22 Claims, No Drawings

NEGATIVE ELECTRODE ACTIVE MATERIAL FOR NONAQUEOUS ELECTROLYTE SECONDARY BATTERIES

CROSS-REFERENCE TO RELATED APPLICATIONS

This application is the United States national phase of International Application No. PCT/JP2013/068597 filed Jul. 8, 2013, and claims priority to Japanese Patent Application No. 2012-152128 filed Jul. 6, 2012, the disclosures of which are hereby incorporated in their entirety by reference.

TECHNICAL FIELD

The present invention relates to a negative electrode active material which can be used for nonaqueous electrolyte secondary batteries such as lithium secondary batteries.

BACKGROUND ART

A negative electrode for nonaqueous electrolyte secondary batteries is generally produced by mixing particles of an active material formed from a material into which lithium ions can be inserted by charging, with a binder, a conductive material, and a solvent, applying the mixture thus obtained on the surface of a current collector, drying the mixture to form a coating film, and further subjecting the coating film to press processing.

In recent years, along with the development in applications such as electric vehicles and smart phones, there is an increasing demand for capacity increase and lengthening of the service life of batteries. Currently, most of the negative electrodes of commercially available batteries use graphite as the negative electrode active material; however, this active material has already reached the theoretical limit in terms of capacity, and it is necessary to develop new negative electrode active materials. One of the promising candidates thereof is active materials containing silicon (also referred to as "silicon-based active materials"). The silicon-based active materials have a potential that the capacity per mass is 5 to 10 times that of graphite. Therefore, the silicon-based active materials are materials that are particularly drawing attention as negative electrode active materials for batteries.

Various new proposals regarding these kinds of silicon-based active materials are made from various aspects.

For example, it has been proposed that the electron conductivity between an additive current collector and the active material is imparted by, for example, adding a conductive auxiliary agent, in order to increase the electron conductivity of silicon-based active materials (for example, see Patent Document 1 and Patent Document 2).

Further, it has been proposed that a surface treatment is carried out with a silane coupling agent, in order to enhance cycle characteristics of the silicon-based active material (for example, see Patent Document 3).

CITATION LIST

Patent Document

Patent Document 1: JP H11-250896 A
Patent Document 2: JP 2000-285919 A
Patent Document 3: JP H11-354104 A

SUMMARY OF THE INVENTION

Problem to be Solved by the Invention

Silicon-based active materials have a potential that the capacity per mass is 5 to 10 times that of graphite as described above. However, on the other hand, silicon-based active materials have a problem. For example, since corrosion products are generated by the reaction between silicon (Si) in the active material and an electrolyte, there is a problem in that the corrosion products are accumulated when charging and discharging are repeated and thus the battery capacity gradually decreases.

Thus, an object of the invention is to propose a novel negative electrode active material for nonaqueous electrolyte secondary batteries in which a decrease in battery capacity can be suppressed effectively even when charging and discharging are repeated.

Means for Solving Problem

The invention is intended to propose a silicon-containing negative electrode active material for nonaqueous electrolyte secondary batteries, the active material including negative electrode active material particles which are provided with a surface layer containing carbon and titanium or aluminum on the entirety or a portion of the surface of the active material.

Effect of the Invention

The negative electrode active material for nonaqueous electrolyte secondary batteries proposed by the invention can suppress the reaction between silicon in the active material and an electrolyte by providing a surface layer containing carbon and titanium or aluminum on the entirety or a portion of the surface of the active material. According to this, accumulation of corrosion products can be prevented and thus the battery capacity can be maintained even when charging and discharging are repeated. Therefore, it is possible to provide a negative electrode for nonaqueous electrolyte secondary batteries with excellent cycle life.

MODE(S) FOR CARRYING OUT THE INVENTION

<Present Negative Electrode Active Material>

The negative electrode active material for nonaqueous electrolyte secondary batteries according to an exemplary embodiment (hereinafter, referred to as the "present negative electrode active material") is a negative electrode active material for nonaqueous electrolyte secondary batteries which includes negative electrode active material particles (hereinafter, referred to as the "present negative electrode active material particles") provided with a surface layer containing carbon and titanium or aluminum on the entirety or a portion of the surface of the active material (referred to as the "core portion") containing silicon.

(Core Portion)

The core portion of the present negative electrode active material includes, for example, a silicon-containing material such as pure silicon, a silicon oxide such as SiO or $SiO_2$, a silicon alloy such as $SiB_4$, $SiB_6$, $Cu_5Si$, $FeSi_2$, or $Mg_2Si$, or a silicon compound such as $Si_3N_4$ or SiC as a main component.

At this time, it is implied that the present negative electrode active material also includes materials obtained by incorporating one or two or more elements selected from the group consisting of Ni, B, Co, Ti, Fe, In, Ag, Cu, and Nb to the above-described silicon oxides, silicon alloys, and silicon compounds. In that case, the elements may be contained in any state, and for example, the elements may be contained in a solid solution state.

The above-described silicon-containing material may also contain one kind or two or more kinds of elements selected from the group consisting of transition metal elements, semi-metal elements or metal elements of Group 3, semi-metal elements or metal elements of Group 4 (provided that silicon is excluded), and non-metal or semi-metal elements of Group 5 (these are collectively referred to as "additive elements"). Preferably, the silicon-containing material may also be a material in which the relevant additive elements are solid-solubilized in one of the silicon-containing materials (referred to as the "silicon solid solution"). Further, the negative electrode active material may also be a mixture of such a silicon solid solution and the silicon-containing materials.

When the particle size of the present negative electrode active material is decreased, the specific surface area is increased. Therefore, deterioration of the negative electrode active material caused by side reactions such as decomposition of the electrolyte at the time of charging and discharging, is likely to occur. Thus, when the additive elements as described above are solid-solubilized, the extent of deterioration of the negative electrode active material caused by side reactions such as decomposition of the electrolyte is decreased, and corrosion can be suppressed. Furthermore, generation of side reaction products not only causes electrode swelling, but also causes inconveniences such as consumption of lithium that is active in the electrode reaction. From such a point of view, among the above-described additive elements, boron, phosphorus, and iron are preferable, and among others, boron is particularly preferable from the viewpoint of suppressing the reactivity with the electrolyte. In this case, it can be considered that, as a result of boron being solid-solubilized in silicon, many holes are introduced into a solid solution. Since the side reactions of the electrolyte on the negative electrode active material are mainly electrophilic reactions, it can be considered that, when many holes exist in the negative electrode active material, the side reactions thereof are reduced.

When an additive element such as boron (B) is solid-solubilized in the silicon-containing material, the content of the relevant additive element is preferably 0.01 atom % to 10 atom %, particularly preferably 1 atom % or more, or 6 atom % or less, and among others, preferably 1 atom % or more, or 3 atom % or less, with respect to 100 atom % of silicon. These values are considerably higher than the conventional cases, and include even a range beyond the theoretical values.

In order to increase the amount of solid solution of the additive element, for example, the increase can be realized by micronizing the active material by a steam explosion atomization method which will be described below, or by micronizing the active material by a water atomization method. However, the invention is not intended to be limited to such methods.

Incidentally, when an additive element such as boron (B) is solid-solubilized, it is preferable to precipitate the relevant additive element on the grain boundaries by performing a heat treatment, from the viewpoint of enhancing the battery characteristics.

As described above, the core portion of the present negative electrode active material may include the above-described silicon-containing material as a main component, may include the above-described silicon solid solution as a main component, or may include a mixture of the above-described silicon solid solution and the above-described silicon-containing material. Further, the core portion of the present negative electrode active material may also include a mixture of these with a silicon alloy as a main component.

In this case, examples of the relevant silicon alloy may include alloys of silicon and transition metals, and examples of the relevant transition metals may include iron, nickel, titanium, cobalt, and copper. Further, the silicon alloy may be an alloy of silicon and niobium.

Incidentally, the term "main component" used in the invention includes the meaning that components other than the relevant main component may be contained, and the content of the main component is preferably 90% by mass or more, particularly preferably 95% by mass or more, and among others, preferably 97% by mass or more.

(Surface Layer)

A surface layer may be present on the entirety or a portion of the surface of the active material (core portion) and may contain carbon and titanium or aluminum.

When such a surface layer is provided on the entirety or a portion of the surface of the active material, the reaction between silicon in the active material and an electrolyte can be suppressed, and thus the battery capacity can be maintained even when charging and discharging are repeated. Further, such a surface layer does not substantially affect the movement of lithium ions.

The relevant surface layer may be present on the surface of the active material so as to cover the entirety of the surface of the active material, or may be partially present on the surface of the active material and the surface of the active material may have a portion where the surface layer is not present.

Further, when observation is carried out with an electronic microscope, it is confirmed that the effect of the invention can be achieved as long as titanium or aluminum is scattered on the surface of the active material although titanium or aluminum is not densely present on the surface of the active material.

Such a surface layer can be formed, for example, in such a manner that a negative electrode active material containing silicon is produced and then the negative electrode active material is subjected to a surface treatment using a coupling agent containing titanium or aluminum. Further, in some cases, it is preferable to perform heating at 300 to 500° C. after the surface treatment, as necessary.

The content of titanium or aluminum in the surface layer is preferably 0.002 to 0.5% by mass, among others, preferably 0.004% by mass or more, or 0.3% by mass or less, and among others, more preferably 0.006% by mass or more, or 0.2% by mass or less.

When the content of titanium or aluminum in the surface layer is 0.002% by mass or more, the reaction between silicon in the active material and an electrolyte can be suppressed effectively. When the content of titanium or aluminum in the surface layer is 0.5% by mass or less, the movement of lithium ions is not interrupted and the reaction with an electrolyte can be suppressed effectively.

The amount of titanium or aluminum in the surface layer can be adjusted according to an adherence amount of a coupling agent.

Further, the amount of carbon in the relevant surface layer is preferably 0.001 to 1.0% by mass of the negative electrode active material particles, among others, preferably 0.002% by mass or more, or 0.8% by mass or less, and among others, more preferably 0.004% by mass or more, or 0.5% by mass or less.

When the amount of carbon in the surface layer is 0.001% by mass or more, dispersibility of the present negative electrode active material can be further improved. When the amount of carbon in the surface layer is 1.0% by mass or less, electrical resistance can be suppressed more effectively.

The amount of carbon in the surface layer can be adjusted according to an adherence amount of a coupling agent, and furthermore, by heating after the coupling treatment.

(Intermediate Layer)

The present negative electrode active material particles may be provided with an intermediate layer containing an oxide of titanium or aluminum between the surface of the active material (core portion) and the surface layer. At this time, the relevant intermediate layer may be formed on the entirety or a portion of the surface of the active material, or the surface layer may be provided on the entirety or a portion of the relevant intermediate layer. In this regard, however, the intermediate layer may not be present.

Further, the thickness of the intermediate layer is preferably 0.1 nm to 2.0 nm.

(Content of Impurities)

In the present negative electrode active material, the total content of iron (Fe), calcium (Ca), phosphorus (P), and oxygen (O) is preferably 0.1 to 2.5% by mass.

When the total content of iron (Fe), calcium (Ca), phosphorus (P), and oxygen (O) in the present negative electrode active material is 0.1% by mass or more, the purity of silicon is not too high, and thus a decrease in electrical conductivity can be suppressed. Moreover, when the relevant total content is 2.5% by mass or less, a high capacity as a negative electrode active material can be maintained.

From such a point of view, the total content of iron (Fe), calcium (Ca), phosphorus (P), and oxygen (O) in the present negative electrode active material is particularly more preferably 2.0% by mass or less, and among others, more preferably 0.5% by mass or more, or 1.0% by mass or less.

Incidentally, the total content of iron (Fe), calcium (Ca), phosphorus (P), and oxygen (O) in the present negative electrode active material can be adjusted by, for example, adjustment of the purity of silicon ingot to be used as a raw material, selection of a crucible at the time of atomization, adjustment of the particle size, and the like.

(Particle Shape)

The particle shape of the present negative electrode active material is not particularly limited. For example, a spherical shape, a polyhedral shape, a spindle shape, a plate shape, a scale shape, or an amorphous shape, or a combination of those can be used. For example, it has been confirmed that the negative electrode active material becomes spherical by gas atomization, and when the active material is pulverized by a jet mill or the like, since particles are split along the grain boundaries, the particles become amorphous shapes.

(D50)

The D50 of the present negative electrode active material is preferably 0.1 μm to 5.0 μm, among others, preferably 4.0 μm or less, and among others, particularly more preferably 3.5 μm or less. When the particle size is adjusted to such a range, reactivity of the negative electrode active material particles is increased so that the cycle characteristics can be increased. In addition, the electrode can have excellent uniform reactivity, and the cycle characteristics are also enhanced thereby. Furthermore, a decrease in the volume energy density can be suppressed.

Incidentally, in order to adjust the D50 of the present negative electrode active material to the above-described range, for example, it is desirable to micronize the active material by a steam explosion atomization method which will be described below, and to conduct pulverization by a jet mill or the like at the same time. However, the invention is not intended to be limited to such a production method.

Incidentally, the laser diffraction scattering type particle size distribution measurement method is a measurement method of regarding aggregated granules as a single particle (aggregated particle), and calculating the particle size thereof. The D50 according to that measurement method means the 50% cumulative volume particle size, that is, the diameter of cumulative 50% from the finer side of the cumulative percentage notation of the particle size measurement values calculated relative to the volume in a volume-based particle size distribution chart.

(Amount of Water)

The amount of water per unit specific surface area of the present negative electrode active material particles (120° C. to 300° C.) is preferably 40 ppm/(m$^2$/g) to 350 ppm/(m$^2$/g), particularly preferably 42 ppm/(m$^2$/g) or more, or 300 ppm/(m$^2$/g) or less, and among others, more preferably 45 ppm/(m$^2$/g) or more, or 270 ppm/(m$^2$/g) or less.

The amount of water on the surface of the present negative electrode active material particles (120° C. to 300° C.) can be adjusted by an adherence amount of the coupling agent, and furthermore, by heating after the coupling treatment.

(Specific Surface Area)

The specific surface area of the present negative electrode active material is preferably 1.0 to 15.0 m$^2$/g, particularly preferably 1.5 m$^2$/g or more, or 14.0 m$^2$/g or less, among others, particularly preferably 1.5 m$^2$/g or more, or 12.0 m$^2$/g or less, and among others, still more preferably 10.0 m$^2$/g or less.

When the specific surface area is adjusted to such a range, reactivity of the negative electrode active material particles is increased so that the cycle characteristics can be increased.

Incidentally, in order to adjust the specific surface area of the present negative electrode active material to the above-described range, for example, it is desirable to micronize the active material by a steam explosion atomization method which will be described below, and to conduct pulverization by a jet mill or the like at the same time. However, the invention is not intended to be limited to such a production method.

(Method for Producing Present Negative Electrode Active Material)

An exemplary method for producing the present negative electrode active material will be described.

First, silicon powder (core portion) is produced.

The silicon powder may be produced by, for example, heating the silicon-containing material to obtain a molten liquid, or mixing the additive elements to the silicon-containing material and heating the mixture to obtain a molten liquid, or heating the silicon-containing material to obtain a molten liquid, and adding the additive elements to this molten liquid, subsequently performing micronization by an atomization method or the like, and, as necessary, and performing pulverization and classification in a non-oxygen atmosphere to thereby adjust the particle size.

Further, the silicon powder may be produced by pulverizing the ingot of silicon in a non-oxygen atmosphere and performing classification to thereby adjust the particle size.

It is preferable to use, as a raw material, a silicon-containing material in which an amount of water on the surface (200 to 300° C.) per unit specific surface area is 0.1 ppm/(m$^2$/g) to 20 ppm/(m$^2$/g), among others, 0.5 ppm/(m$^2$/g) or more, or 15 ppm/(m$^2$/g) or less, and among others, 1.0 ppm/(m$^2$/g) or more, or 10 ppm/(m$^2$/g) or less.

When the silicon-containing material having a small amount of water on the surface as described above is used as a raw material and then subjected to a coupling agent treatment, even in the case of using a relatively small amount of a coupling agent, the coupling agent can be attached to the surfaces of the silicon-containing material particles and the thickness of the surface layer can be decreased.

Incidentally, in order to obtain a silicon-containing material in which an amount of water on the surface (200 to 300° C.) per unit specific surface area is 0.1 ppm/(m$^2$/g) to 20 ppm/(m$^2$/g), for example, the silicon-containing material may be dried before the silicon-containing material is used as a raw material, or the silicon-containing material may be subjected to a pulverization treatment in an inert gas (for example, nitrogen gas) atmosphere.

Regarding the atomization method, for example, it is preferable to employ a method of micronizing a molten metal dropped into a cooling medium by utilizing the pressure wave generated by inducing boiling by spontaneous nucleation, using the apparatus described in FIG. 2 of WO 01/081033 A (this micronization method is referred to as a "steam explosion atomization method" in the present specification). However, the invention is not intended to be limited to such an atomization method.

Subsequently, the silicon powder obtained in this way is subjected to a surface treatment using a coupling agent containing titanium or aluminum and dried, and the solvent is volatilized. Therefore, the present negative electrode active material can be obtained. At this time, in some cases, it is preferable that heating be carried out at 300 to 500° C. after the solvent is volatilized, depending on types of the coupling agent.

As the coupling agent containing titanium or aluminum, a compound having an organic functional group and a hydrolyzable group in the molecule may be used, and among others, a coupling agent having an amino group at a side chain is preferably used. The coupling agent having an amino group at a side chain has a better adhesion with a binder and thus is particularly excellent in the binding property with the binder.

In a case in which the active material is subjected to the surface treatment using such a coupling agent, it is necessary to perform drying by heating at, for example, 40 to 120° C., in order to volatilize a solvent. In some cases, it is preferable that heating be further carried out at 300 to 500° C., depending on types of the coupling agent.

By heating at 300 to 500° C. in this way, in some cases, the surface layer can be oxidized, and thus charge-discharge cycle ability can be further improved depending on types of the coupling agent.

<Present Negative Electrode>

The negative electrode related to this exemplary embodiment (hereinafter, referred to as the "present negative electrode") is a negative electrode for nonaqueous electrolyte secondary batteries, in which a coating film containing the present negative electrode active material, a binder, as necessary, a conductive material, and as necessary, graphite as a negative electrode active material is provided on a current collector.

(Binder)

Regarding the binder, any of a polyimide, a polyamide and a polyamideimide may be used. These may be used singly, or two or more kinds thereof may be used in combination (hereinafter, these may also be collectively referred to as "polyimide and the like"). A binder other than these may also be used in combination therewith.

Regarding the polyimide and the like described above, commercially available products can be used without limitations. Particularly for the polyamide, it is preferable to use a polyamide having a glass transition point Tg of 200 to 400° C. Also for the polyamideimide, it is preferable to use a polyamideimide having a glass transition point Tg of 200 to 400° C.

It is preferable that the polyimide and the like described above be fixed to at least a portion of the surface of the negative electrode active material particles (hereinafter, when simply described as "active material particles", this means "negative electrode active material particles").

A particularly preferred embodiment of the form of fixation of the polyimide and the like is a form in which the polyimide and the like are fixed planarly in at least a portion of the surface of the active material particles. The term "planarly" has the same meaning as film-like, and means a state that is opposite to the state in which objects are scattered in a dotted fashion. Furthermore, the term "fixation" means a state in which the active material particles and the polyimide and the like are bonded in a state in which a mechanical bonding force (for example, an anchoring effect such as engagement or interdigitation) or a chemical bonding force is generated. A state in which the active material particles and the polyimide and the like are simply mixed, and consequently the two components are only in contact with each other, does not correspond to "fixation".

The method for fixing the polyimide and the like planarly onto the surface of the active material particles will be described below.

It is preferable that the polyimide and the like do not cover the entirety of the surface of the active material particles, but be fixed to the surface in the form in which there are areas where the polyimide and the like are not fixed, remaining on the surface of the active material particles. Furthermore, it is preferable that adjacent active material particles be in contact with each other in the areas where the polyimide and the like are not fixed, and at the same time, the polyimide and the like be fixed and connected to the periphery of the contact points. As such, electron conductivity can be secured by bringing the active material particles into contact with each other through areas where the polyimide and the like are not fixed.

It is preferable that the polyimide and the like that are fixed planarly to the surface of the active material particles, be connected integrally through the connection sites formed by the polyimide and the like that are fixed to the surface of other active material adjoining the relevant particles. That is, as described above, the active material particles are preferably such that adjacent particles are in contact with each other, and also, the polyimide and the like that are fixed to the periphery of the contact points thereof are connected to each other and form connection sites.

The connection sites formed by the polyimide and the like can be elongated while maintaining a fixed state with the particles when lithium ions are inserted into the active material particles, and thus the active material particles undergo expansion. Thereby, detachment of the active material particles from the active material layer caused by expansion is effectively prevented, and the cycle characteristics at the time of charging and discharging are enhanced.

Furthermore, this also contributes to the suppression of increase in the thickness of the battery resulting from charging. Suppression of increase in the thickness of the battery resulting from charging is particularly effective when the negative electrode of the invention is applied to a battery that is used in a place where the battery storage space is limited, as in the case of a battery for mobile telephones. On the other hand, when lithium ions are released from the active material particles due to discharging, the particles undergo contraction. Therefore, the connection sites can also undergo contraction along with the contraction of the particles. As such, since the connection sites formed by the polyimide and the like are connecting between the active material particles in a manner similar to that of a spring, the particles are effectively prevented from being detached from the active material layer.

In addition to that the active material particles are connected with each other through connection sites formed by the polyimide and the like, it is more preferable that plural active material particles be connected in a rosary shape through the connection sites described above. At this time, the rosary-like connection may be a straight form, or may be a meandering form. Moreover, the rosary-like connection may be in a literally cyclic form, or may be in a non-cyclic form.

In addition, the rosary-like connection may be in the form of a single line, or may be in a branched form. When plural active material particles are connected in a rosary shape, an increase in volume caused by expansion of the active material particles is further relieved by the rearrangement of the rosary-like connection, and an increase in the thickness of the battery resulting from charging is further suppressed.

In order to have plural active material particles connected in a rosary shape as such, for example, a negative electrode mixture may be applied on a current collector, and then, as will be described below, the negative electrode mixture may be dried by heating at a relatively low temperature. However, the invention is not intended to be limited to this method. It is speculated to be possibly such that when the negative electrode mixture is not dried rapidly but is dried mildly, there occur pathways through which the solvent is volatilized, and the active material particles are arranged along these pathways.

The proportion of the polyimide and the like contained in the active material layer is preferably 1 to 15% by mass, and particularly more preferably 2% by mass or more, or 10% by mass or less, with respect to the mass of the active material particles.

(Conductive Material)

Regarding the conductive material, for example, a fine metal powder or a powder of a conductive carbon material such as acetylene black can be used. In the case of using a fine metal powder as the conductive material, it is preferable to use a fine powder of a metal having lithium ion conductivity, such as Sn, Zn, Ag, or In, or of an alloy of these metals.

(Graphite)

By adding graphite as a negative electrode active material to the present negative electrode active material, an increase in capacity attributable to silicon, and satisfactory cycle characteristics attributable to graphite can be both obtained.

(Mixing Composition)

The content of the binder in the present negative electrode is preferably 1 part to 15 parts by mass, and particularly preferably 2 parts by mass or more, or 10 parts by mass or less, with respect to 100 parts by mass of the present negative electrode active material.

Further, in the case of incorporating a conductive material, the content of the conductive material is preferably 1 part to 10 parts by mass, and particularly preferably 2 parts by mass or more, or 5 parts by mass or less, with respect to 100 parts by mass of the present negative electrode active material.

Furthermore, in the case of incorporating graphite as a negative electrode active material, the content of graphite is preferably such that the mixing mass ratio of the present negative electrode active material and graphite is 0.5:95 to 50:50, and particularly 10:90.

(Method for Producing Present Negative Electrode)

The present negative electrode can be formed by mixing the present negative electrode active material (particulate), a binder, a conductive material, and a solvent to prepare a negative electrode mixture, applying this negative electrode mixture on the surface of a current collector formed by Cu or the like, drying the negative electrode mixture to thereby form a negative electrode active material layer, and then pressing the active material layer as necessary.

Regarding the drying after the application of the negative electrode mixture on the surface of the current collector, it is preferable to perform drying in a non-oxygen atmosphere, for example, in an argon atmosphere, for 1 hour to 10 hours, and particularly for 1 hour to 7 hours.

Here, the method for producing the present negative electrode in the case of using a polyimide as the binder will be described.

First, the present negative electrode active material (particulate), a polyimide precursor compound, an organic solvent such as N-methyl-2-pyrrolidone, and as necessary, a conductive material such as a fine metal powder or acetylene black are mixed to prepare a negative electrode mixture, and this negative electrode mixture is applied on the surface of the current collector formed by Cu or the like.

At this time, polyamic acid (polyamide acid) can be used as the polyimide precursor compound.

When the negative electrode mixture is applied on the surface of the current collector, the coating film is heated preferably at a temperature exceeding 300° C., particularly preferably at 310° C. or higher, and among others, preferably at 315° C. or higher to thereby volatilize the organic solvent, and also the polyimide precursor compound is polymerized. Thus, a polyimide can be produced.

At this time, by regulating the polymerization conditions for the relevant precursor compound, the polyimide can be fixed planarly to the surface of the active material particles, and the active material can be connected in a rosary shape through the connection sites formed by the polyimide.

Regarding the polymerization conditions for the precursor compound, it has been found as a result of the investigations of the inventors of the invention that it is advantageous to perform heating in multiple stages. Particularly, it is advantageous to perform heating in at least two stages, suitably in at least three stages, and more preferably in four stages. For example, in the case of performing heating in two stages, it is preferable to perform heating of a first stage at 100 to 150° C., and it is preferable to perform heating of a second stage at a temperature exceeding 300° C., for example, at 310 to 400° C.

In regard to the heating time, it is preferable to set the heating time of the first stage to be equal to the heating time of the second stage, or to be longer than the heat time of the second stage. For example, it is preferable to set the heating time of the first stage to 120 to 300 minutes, and particularly preferably to 180 minutes or longer, or 240 minutes or shorter, and to set the heating time of the second stage to 30 to 120 minutes, and particularly preferably to 30 to 60 minutes.

In the case of performing heating in three stages, it is preferable to employ a heating temperature that is intermediate between the temperatures of the first stage and the second stage in relation to the heating of two stages as described above.

This intermediate heating is preferably carried out at 150 to 190° C. It is preferable to set the heating time to be equal to the time of the first stage and the second stage, or to a time period that is intermediate between the heating times of the first stage and the second stage. That is, in the case of performing heating in three stages, it is preferable to set the heating times of the respective stages to be equal, or to shorten the heating time as the stage progresses.

Furthermore, in the case of performing heating in four stages, it is preferable to employ a heating temperature higher than that of the third stage.

It is preferable to perform heating in an inert atmosphere of argon or the like, regardless of how many stages heating is carried out, and heating at the final stage is preferably at a temperature exceeding 300° C., and particularly preferably at 310° C. or higher.

Further, at the time of performing a heating treatment, it is also preferable to press the active material layer with a pressing member such as a glass plate. It is because when the active material layer is treated in this manner, polyamic acid can be polymerized in a state in which the organic solvent is abundant, that is, in a state as if the polyamic acid is saturated in the organic solvent, and thus the molecular chains of the polyimide thus produced are easily entangled.

When multistage heating is carried out as described above, the organic solvent contained in the negative electrode mixture can be gradually volatilized. Accordingly, the polyamide precursor compound can be made to have a sufficiently high molecular weight, and also, the polyimide can be fixed over a wide range of the surface of the active material particles. Therefore, voids can be formed inside the active material layer in the form of a three-dimensional network extending over the entirety of the thickness direction of the layer.

Meanwhile, in the case of using a polyamide or a polyamideimide as well, a heating treatment can be carried out similarly to the case of the polyimide described above. However, when a polyamide or a polyamideimide is used, it is preferable to form an active material layer by applying a negative electrode mixture containing a polyamide or a polyamideimide and particles of the active material on the surface of a current collector, and then heating and drying the coating film in a temperature range of Tg−100° C. to Tg+100° C. (wherein Tg represents a glass transition point of the polyamide or polyamideimide), and particularly in Tg−100° C. to Tg. It has been found as a result of investigations carried out by the inventors of the invention that the cycle characteristics are further enhanced by performing drying as such. A further enhancement of the cycle characteristics becomes more noticeable when the drying process described above is carried out in a temperature range of Tg−50° C. to Tg+50° C., among others, particularly in a temperature range of Tg−50° C. to Tg, and among others, at a temperature exceeding 300° C., for example, in a temperature range of 310° C. or higher.

The glass transition point of the polyamide or polyamideimide is measured using TG-DTA6200 (manufactured by Seiko Instruments Inc.) in an argon atmosphere, by setting a scan speed at 5° C/min.

<Nonaqueous Electrolyte Secondary Battery>

The nonaqueous electrolyte secondary battery according to this exemplary embodiment (referred to as the "present secondary battery") can be configured to include the present negative electrode, a positive electrode, a separator, a nonaqueous electrolyte, and the like. The present secondary battery can be used as a so-called lithium secondary battery.

(Positive Electrode)

A positive electrode has, for example, a positive electrode active material layer formed on at least one surface of a current collector.

The positive electrode active material layer contains a positive electrode active material. Regarding the positive electrode active material, any active material conventionally known in the pertinent technical field can be used without any particular limitations. For example, various lithium-transition metal composite oxides can be used. Examples of such materials include $LiCoO_2$, $LiNiO_2$, $LiMnO_2$, $LiMn_2O_4$, $LiCo_{1/3}Ni_{1/3}Mn_{1/3}O_2$, $LiCo_{0.5}Ni_{0.5}O_2$, $LiNi_{0.7}Co_{0.2}Mn_{0.1}O_2$, $Li(Li_xMn_{2x}Co_{1-3x})O_2$ (wherein $0<x<1/3$), $LiFePO_4$, $LiMn_{1-z}M_zPO_4$ (wherein $0<z\leq0.1$, and M represents at least one metal element selected from the group consisting of Co, Ni, Fe, Mg, Zn, and Cu).

(Separator)

Regarding the separator that is used together with the negative electrode and the positive electrode, a non-woven fabric made of a synthetic resin, porous films of polyolefins such as polyethylene and polypropylene, or of polytetrafluoroethylene, and the like are preferably used.

(Nonaqueous Electrolyte)

A nonaqueous electrolyte is formed from a solution in which a lithium salt as a supporting electrolyte is dissolved in an organic solvent. Regarding the organic solvent, for example, use is made of one kind or a combination of two or more kinds of carbonate-based organic solvents such as ethylene carbonate, propylene carbonate, dimethyl carbonate, methyl ethyl carbonate, and diethyl carbonate; and fluorine-based organic solvents obtained by partially fluorinating the carbonate-based organic solvents, such as fluoroethylene carbonate. Specifically, fluoroethylene carbonate, diethyl fluorocarbonate, dimethyl fluorocarbonate, and the like can be used. Examples of the lithium salt include $CF_3SO_3Li$, $(CF_3SO_2)NLi$, $(C_2F_5SO_2)_2NLi$, $LiClO_4$, $LiAlCl_4$, $LiPF_6$, $LiAsF_6$, $LiSbF_6$, $LiCl$, $LiBr$, $LiI$, $LiC_4F_9SO_3$. These can be used singly or in combination of two or more kinds thereof.

<Explanation of Terms>

When the expression "X to Y" (X and Y being arbitrary numbers) is used in the present specification, unless particularly stated otherwise, the expression includes the meaning of "X or more but Y or less", as well as the meaning of "preferably more than X" or "preferably less than Y".

Further, when the expression "X or more" (X being an arbitrary number) or "Y or less" (Y being an arbitrary number) is used, the meaning to the effect of "being preferably more than X" or "being preferably less than Y" is also included.

EXAMPLES

Hereinafter, the invention will be described in more detail by way of Examples. However, the scope of the invention is not intended to be limited by such Examples.

Example 1

(1) Production of Negative Electrode Active Material

An ingot of silicon (Si) was subjected to coarse pulverization, and further subjected to particle size adjustment using a jet mill pulverizer in a nitrogen atmosphere (air in an amount of less than 1%, the balance being nitrogen vaporized from liquefied nitrogen (purity 99.999% or more)) to thereby obtain a fine silicon powder having an amorphous shape.

When the content of impurities in the obtained fine silicon powder was measured, the total content of iron (Fe), calcium (Ca), phosphorus (P), and oxygen (O) was 0.64% by mass.

Further, when the amount of water on the surface of the obtained fine silicon powder was measured, the amount of water on the surface (200 to 300° C.) was 25 ppm, the specific surface area of the fine silicon powder was 4.3 m$^2$/g, and the amount of water on the surface (200 to 300° C.) per unit specific surface area was 5.8 ppm/(m$^2$/g).

100 parts by mass of the silicon powder obtained as described above, 1.0 part by mass of aluminate-based coupling agent (PLENACT (registered mark) AL-M from Ajinomoto Fine-Techno Co., Inc.) as a surface treatment agent, and 1.4 parts by mass of isopropyl alcohol as a solvent were mixed using a cutter mill (Millser 720G manufactured by Iwatani Corporation). Subsequently, the mixed silicon powder was subjected to a heating treatment under vacuum at 100° C. for 1 hour to thereby obtain a surface-treated silicon powder (D50: 3.2 μm, specific surface area: 4.4 m$^2$/g).

(2) Preparation of Negative Electrode Mixture

A negative electrode mixture was obtained by mixing 100 parts by mass of the surface-treated silicon powder obtained as described above, 5 parts by mass of conductive material (acetylene black), 5 parts by mass of polyimide precursor compound (polyamic acid), and 100 parts by mass of N-methyl-2-pyrrolidone.

(3) Production of Negative Electrode

The negative electrode mixture prepared as described above was applied on one surface of an electrolyte copper foil such that a thickness of the coating film was 12 μm. Subsequently, the coating film was heated in an argon atmosphere under reduced pressure to perform polymerization of the precursor compound, and thus a negative electrode was produced.

Incidentally, heating was carried out in four stages. Heating of a first stage was carried out at 120° C. for 4 hours, heating of a second stage was carried out at 150° C. for 1 hour, heating of a third stage was carried out at 200° C. for 1 hour, and heating at a fourth stage was carried out at 310° C. for 1 hour. During heating, the current collector having the coating film formed thereon was sandwiched between two sheets of glass plates.

For the negative electrode produced as described above, when the vicinity of the interface of the current collector in a vertical cross-section of the active material layer was observed with a scanning microscope, the surface layer was present on a portion of the surface of the active material particles (core portion) formed by silicon, and aluminum (Al) was scattered on the surface of the active material particles (core portion). Further, when the surface layer was analyzed with EDX, it was found that the surface layer contained oxygen, aluminum, and carbon.

Further, the polyimide was fixed planarly to the surface of the active material particles formed by silicon. Furthermore, adjoining active material particles were in contact with each other, and also, adjoining active material particles were connected into a rosary form by connection sites formed by polyimide. Furthermore, the active material particles and the current collector were also connected by the connection sites formed by polyimide.

Example 2

A surface-treated silicon powder (D50: 3.3 μm, specific surface area: 4.5 m$^2$/g), a negative electrode mixture, and a negative electrode were obtained in the same manner as in Example 1, except that a titanate-based coupling agent (PLENACT KR-44 from Ajinomoto Fine-Techno Co., Inc.) was used as a surface treatment agent instead of an aluminate-based coupling agent (PLENACT AL-M from Ajinomoto Fine-Techno Co., Inc.).

For the negative electrode produced as described above, when the vicinity of the interface of the current collector in a vertical cross-section of the active material layer was observed with a scanning microscope, the surface layer was present on a portion of the surface of the active material particles (core portion) formed by silicon, and titanium was scattered on the surface of the active material particles (core portion). Further, when the surface layer was analyzed with EDX, it was found that the surface layer contained oxygen, titanium, and carbon.

Further, the polyimide was fixed planarly to the surface of the active material particles formed by silicon. Furthermore, adjoining active material particles were in contact with each other, and also, adjoining active material particles were connected into a rosary form by connection sites formed by polyimide. Furthermore, the active material particles and the current collector were also connected by the connection sites formed by polyimide.

Comparative Example 1

A negative electrode mixture and a negative electrode were obtained in the same manner as in Example 1, except that a fine silicon powder before the surface treatment (D50: 3.2 μm, specific surface area: 4.3 m$^2$/g) was produced in the same manner as in Example 1 and this fine silicon powder was used as a negative electrode active material.

Example 3

(1) Production of negative electrode active material

An ingot of silicon (Si) was heated to melt, and the molten liquid that had been heated to 1600° C. was subjected to steam explosion atomization using the apparatus described in FIG. 2 of WO 01/081033 A. At this time, the inner diameter of a cylindrical mixing nozzle 2 was set to 2.0 mm, and the amount of the coolant circulating in the mixing nozzle was set to 100 L/min. Water at room temperature was used as the coolant. A molten liquid of silicon was dropped (free-fall dropping) into the mixing nozzle 2 in an amount of 13 g each. The cooling rate at this time was estimated to be $10^6$ K/s to $10^8$ K/s. At this time, boron was added, and the solid solubilized amount of boron was 5 parts by mass with respect to 100 parts by mass of silicon.

The silicon powder obtained by the steam explosion atomization was further subjected to particle size adjustment using a jet mill pulverizer in a nitrogen atmosphere (air in an amount of less than 1%, the balance being nitrogen vaporized from liquefied nitrogen (purity 99.999% or more)), and thus a fine silicon powder was obtained as the negative electrode active material.

When the content of impurities in the obtained fine silicon powder was measured, the total content of iron (Fe), calcium (Ca), phosphorus (P), and oxygen (O) was 0.77% by mass.

Further, when the amount of water on the surface of the obtained fine silicon powder was measured, the amount of water on the surface (200 to 300° C.) was 18 ppm, the specific surface area of the fine silicon powder was 2.7 m²/g, and the amount of water on the surface (200 to 300° C.) per unit specific surface area was 6.7 ppm/(m²/g).

100 parts by mass of the silicon powder obtained as described above, 1 part by mass of titanate-based coupling agent (PLENACT KR-44 from Ajinomoto Fine-Techno Co., Inc.) as a surface treatment agent, and 1.4 parts by mass of isopropyl alcohol as a solvent were mixed using a cutter mill (Millser 720G manufactured by Iwatani Corporation). Subsequently, the mixed silicon powder was subjected to a heating treatment under vacuum at 100° C. for 1 hour to thereby obtain a surface-treated silicon powder (D50: 3.4 µm, specific surface area: 2.8 m²/g).

(2) (3) Preparation of Negative Electrode Mixture and Negative Electrode

A negative electrode mixture and a negative electrode were obtained in the same manner as in Example 1, using the surface-treated silicon powder obtained as described above.

For the negative electrode produced as described above, when the vicinity of the interface of the current collector in a vertical cross-section of the active material layer was observed with a scanning microscope, the surface layer was present on a portion of the surface of the active material particles (core portion) formed by silicon, and titanium was scattered on the surface of the active material particles (core portion). Further, when the surface layer was analyzed with EDX, it was found that the surface layer contained oxygen, titanium, and carbon.

Further, the polyimide was fixed planarly to the surface of the active material particles formed by silicon. Furthermore, adjoining active material particles were in contact with each other, and also, adjoining active material particles were connected into a rosary form by connection sites formed by polyimide. Furthermore, the active material particles and the current collector were also connected by the connection sites formed by polyimide.

Example 4

A titanate-based coupling agent (PLENACT KR-46B from Ajinomoto Fine-Techno Co., Inc.) was used as a surface treatment agent instead of a titanate-based coupling agent (PLENACT KR-44 from Ajinomoto Fine-Techno Co., Inc.). Further, 100 parts by mass of the obtained silicon powder, 1 part by mass of the titanate-based coupling agent, and 1.4 parts by mass of isopropyl alcohol as a solvent were mixed using a cutter mill (Millser 720G manufactured by Iwatani Corporation). Subsequently, the mixed silicon powder was subjected to a heating treatment under vacuum at 100° C. for 1 hour. Thereafter, a treatment was further carried out at 500° C. for 2 hours in a nitrogen atmosphere to thereby obtain a surface-treated silicon powder (D50: 3.5 µm, specific surface area: 2.6 m²/g). Other processes were carried out in the same manner as in Example 3, and thus a negative electrode mixture and a negative electrode were obtained.

For the negative electrode produced as described above, when the vicinity of the interface of the current collector in a vertical cross-section of the active material layer was observed with a scanning microscope, the surface layer was present on a portion of the surface of the active material particles (core portion) formed by silicon, and titanium was scattered on the surface of the active material particles (core portion). Further, when the surface layer was analyzed with EDX, it was found that the surface layer contained oxygen, titanium, and carbon.

Further, the polyimide was fixed planarly to the surface of the active material particles formed by silicon. Furthermore, adjoining active material particles were in contact with each other, and also, adjoining active material particles were connected into a rosary form by connection sites formed by polyimide. Furthermore, the active material particles and the current collector were also connected by the connection sites formed by polyimide.

Example 5

A negative electrode mixture and a negative electrode were obtained in the same manner as in Example 4, except that an aluminate-based coupling agent (PLENACT AL-M from Ajinomoto Fine-Techno Co., Inc.) was used as a surface treatment agent instead of a titanate-based coupling agent (PLENACT KR-44 from Ajinomoto Fine-Techno Co., Inc.) to thereby obtain a surface-treated silicon powder (D50: 3.5 µm, specific surface area: 2.7 m²/g).

For the negative electrode produced as described above, when the vicinity of the interface of the current collector in a vertical cross-section of the active material layer was observed with a scanning microscope, the surface layer was present on a portion of the surface of the active material particles (core portion) formed by silicon, and aluminum (Al) was scattered on the surface of the active material particles (core portion). Further, when the surface layer was analyzed with EDX, it was found that the surface layer contained oxygen, aluminum, and carbon.

Further, the polyimide was fixed planarly to the surface of the active material particles formed by silicon. Furthermore, adjoining active material particles were in contact with each other, and also, adjoining active material particles were connected into a rosary form by connection sites formed by polyimide. Furthermore, the active material particles and the current collector were also connected by the connection sites formed by polyimide.

Comparative Example 2

A negative electrode mixture and a negative electrode were obtained in the same manner as in Example 3, except that a fine silicon powder before the surface treatment (D50: 3.3 µm, specific surface area: 2.7 m²/g) was produced in the same manner as in Example 3 and this fine silicon powder was used as a negative electrode active material.

<Method for Measuring Amount of Impurities>

The content of iron (Fe), calcium (Ca), phosphorus (P), and oxygen (O) in each of the fine silicon powders (before the coupling treatment) obtained in Examples and Comparative Examples was measured using an emission spectroscopic analysis (ICP) apparatus and an oxygen-nitrogen analyzer (EMGA-620W, HORIBA, Ltd.).

<Measurement of Amount of Carbon in Surface Layer>

The content of carbon (C) in each of the fine silicon powders (before the coupling treatment) and the negative electrode active materials (after the coupling treatment) obtained in Examples and Comparative Examples was measured using a carbon-sulfur analyzer (EMIA-920V, HORIBA, Ltd.), and the amount of carbon in the surface layer was calculated from a difference between the content of carbon in the fine silicon powder and the content of carbon in the negative electrode active material.

<Measurement of D50>

For each of the samples (powder) obtained in Examples and Comparative Examples, a sample (powder) was dispersed at a pressure of 0.414 MPa using an automatic sample supplier for laser diffraction particle size distribution analyzer ("Microtrac SDC" manufactured by NIKKISO CO., LTD.) to measure the particle size distribution (dry method) using a laser diffraction particle size distribution analyzer "MT3000II" manufactured by NIKKISO CO., LTD., and D50 was determined from a volume-based particle size distribution chart thus obtained.

Incidentally, the average value obtained by performing measurement two times under the measurement conditions of reflection for the particle transparency condition, a non-spherical shape, a measurement range of 0.133 to 704.0 μm, and a measurement time of 30 seconds, was defined as D50.

<Specific Surface Area>

For the measurement sample (powder), 0.5 g of sample (powder) was weighed in a glass cell for MONOSORB LOOP ("product name: MS-18" manufactured by Yuasa Ionics Inc.), that is a specific surface area measurement device by a flow gas adsorption method, the interior of the glass cell was substituted with nitrogen gas for 5 minutes with a gas amount of 30 mL/min in a pretreatment device for the above MONOSORB LOOP, and then a heating treatment was carried out at 250° C. for 10 minutes in the above nitrogen gas atmosphere. Thereafter, the sample (powder) was measured by a BET one point method using the above MONOSORB LOOP.

Incidentally, the adsorption gas used during the measurement was a mixed gas of 30% nitrogen: 70% helium.

<Measurement of Amount of Water According to Karl-Fischer Method>

For the amount of water on the surface of the fine silicon powder (before the coupling treatment) obtained in each of Examples and Comparative Examples, the amount of water released when the fine silicon powder was heated to 200° C. to 300° C. under the conditions to be described below was measured using a Karl-Fisher moisture meter to be described below, and the amount of water at 200 to 300° C. was determined.

Apparatus: Moisture vaporizing apparatus "KEMADP-611"/Karl-Fisher moisture meter "MKC-610-DJ"

Measurement: The amount of water at 200° C. was measured, subsequently the temperature was increased to 300° C., the amount of water at 200° C. to 300° C. was measured, and thus the amount of water at 200° C. to 300° C. was determined.

Temperature increase: 10° C./min

Flow rate: Argon at 70 mL/min

Reagent: HYDRANAL COULOMAT AG and HYDRANAL COULOMAT CG

On the other hand, for the amount of water on the surface of the negative electrode active material (powder) obtained in each of Examples and Comparative Examples, the amount of water released when the negative electrode active material (powder) was heated to 120° C. to 300° C. under the conditions to be described below was measured using a Karl-Fisher moisture meter to be described below, and the amount of water at 120° C. to 300° C. was determined. The determined amounts of water are shown as "amount of water at 120 to 300° C. (ppm)" in Table.

Apparatus: Moisture vaporizing apparatus "KEMADP-611"/Karl-Fisher moisture meter "MKC-610-DJ"

Measurement: The amount of water at 120° C. was measured, subsequently the temperature was increased to 300° C., the amount of water at 120° C. to 300° C. was measured, and thus the amount of water at 120° C. to 300° C. was determined.

Temperature increase: 10° C./min

Flow rate: Argon at 70 mL/min

Reagent: HYDRANAL COULOMAT AG and HYDRANAL COULOMAT CG

<Evaluation of Battery Characteristics>

Lithium secondary batteries were produced using the negative electrodes obtained in Examples and Comparative Examples, and the cycle characteristics (capacity retention) upon repeating charging and discharging at normal temperature were measured.

(Production of Battery)

A solution obtained by dissolving 1 mol/L of $LiPF_6$ in a mixed solvent of ethylene carbonate and diethyl carbonate at a volume ratio of 1:1, was used as an electrolyte.

A polypropylene porous film was used as a separator. The negative electrode thus obtained was punched into a circle having a diameter of 14 mm, and was subjected to vacuum drying at 160° C. for 6 hours. Then, a 2032 coin cell was assembled in a glove box in an argon atmosphere.

Metal lithium was used as a counter electrode. A solution obtained by dissolving 1 mol/L of $LiPF_6$ in a mixed solvent of ethylene carbonate and diethyl carbonate at a volume ratio of 1:1, was used as an electrolyte. A polypropylene porous film was used as a separator.

(Charge-discharge Conditions)

Charging was carried out in a constant current-constant voltage charging mode, at a constant current until the battery voltage reached 0.001 V. Thereafter, the time point when the current value that decreased by constant voltage charging control reached 0.02 C, was defined as completion of charging.

Discharging was carried out at a constant current until the battery voltage reached 1.5 V.

Charging and discharging were carried out in normal temperature, and the rate in the charge-discharge cycle was set to 0.1 C for the first cycle and to 0.2 C from the second cycle and on in Examples 1 to 5 and Comparative Examples 1 and 2.

In regard to the evaluation of the charge-discharge cycle characteristics, the discharge capacities at the 20th cycle in a case in which each of the discharge capacities at the second cycle was designated as 100% in Examples 1 to 5 and Comparative Examples 1 and 2, were compared as the capacity retention.

Incidentally, in Examples 1 to 5 and Comparative Examples 1 and 2, 6.93 mA was designated as 1 C. The respective current values of C rate were calculated on the basis of the current value of that 1 C, and the current values were used for the evaluation of capacity retention.

TABLE 1

| | Main component of core portion | Surface layer | | | | Capacity retention [%] after 20 cycles |
| | | Type of coupling agent | Ti amount [wt %] | Al amount [wt %] | Carbon amount [wt %] | D50 [μm] | |
|---|---|---|---|---|---|---|---|
| Example 1 | Si | aluminate-based | — | 0.07 | 0.38 | 3.2 | 90 |

TABLE 1-continued

|  | Main | Surface layer | | | | Capacity |
| --- | --- | --- | --- | --- | --- | --- |
|  | component of core portion | Type of coupling agent | Ti amount [wt %] | Al amount [wt %] | Carbon amount [wt %] | D50 [μm] | retention [%] after 20 cycles |
| Example 2 | Si | titanate-based | 0.11 | — | 0.04 | 3.3 | 94 |
| Comparative Example 1 | Si | not treated | — | — | — | 3.2 | 86 |
| Example 3 | 5at % B—Si | titanate-based | 0.10 | — | 0.16 | 3.4 | 87 |
| Example 4 | 5at % B—Si | titanate-based | 0.05 | — | 0.01 | 3.5 | 84 |
| Example 5 | 5at % B—Si | aluminate-based | — | 0.11 | 0.07 | 3.5 | 84 |
| Comparative Example 2 | 5at % B—Si | not treated | — | — | — | 3.3 | 81 |

(Discussion)

The measurement results of the negative electrode active materials obtained in Examples and Comparative Examples are presented in Table 1.

As is obvious from Table 1, it was found that, when the negative electrode active materials obtained in respective Examples were used, the capacity retention was improved, as compared with the case of using the negative electrode active materials obtained in Comparative Examples.

The invention claimed is:

1. A silicon-containing negative electrode active material for nonaqueous electrolyte secondary batteries, wherein the negative electrode active material particles comprise a surface layer comprising carbon and titanium or aluminum on an entirety or a portion of a surface of a core portion,
    wherein the core portion comprises: pure silicon; a silicon alloy selected from $SiB_4$ or $SiB_6$, $Cu_5Si$, $FeSi_2$, or $Mg_2Si$; or a silicon compound selected from $Si_3N_4$ or SiC in an amount of 90% by mass or more, and
    a content of titanium or aluminum in the surface layer is 0.002 to 0.07% by mass of the silicon-containing negative electrode active material particles.

2. The silicon-containing negative electrode active material for nonaqueous electrolyte secondary batteries according to claim 1, wherein a content of carbon in the surface layer is 0.004 to 0.5% by mass of the silicon-containing negative electrode active material particles.

3. The silicon-containing negative electrode active material for nonaqueous electrolyte secondary batteries according to claim 1, wherein said surface layer is formed from an organic compound comprising carbon and titanium or aluminum, which is a coupling agent containing the titanium or aluminum.

4. The silicon-containing negative electrode active material for nonaqueous electrolyte secondary batteries according to claim 3, wherein said negative electrode active material particles are subjected to heating at 300 to 500° C.

5. The silicon-containing negative electrode active material for nonaqueous electrolyte secondary batteries according to claim 3, wherein said coupling agent containing titanium or aluminum further has an amino group at a side chain.

6. The silicon-containing negative electrode active material for nonaqueous electrolyte secondary batteries according to claim 1, wherein D50 measured by a laser diffraction scattering type particle size distribution measurement method is 0.1 μm to 5.0 μm.

7. A negative electrode for nonaqueous electrolyte secondary batteries, comprising the active material for nonaqueous electrolyte secondary batteries according to claim 1, and a binder.

8. A negative electrode for nonaqueous electrolyte secondary batteries, comprising the active material for nonaqueous electrolyte secondary batteries according to claim 1 as a first negative electrode active material, a graphite as a second negative electrode active material, and a binder.

9. The negative electrode for nonaqueous electrolyte secondary batteries according to claim 7, wherein the binder is a polyimide.

10. A nonaqueous electrolyte secondary battery comprising the negative electrode according to claim 7.

11. A nonaqueous electrolyte secondary battery comprising the negative electrode according to claim 8.

12. A nonaqueous electrolyte secondary battery comprising the negative electrode according to claim 9.

13. The silicon-containing negative electrode active material for nonaqueous electrolyte secondary batteries according to claim 1, wherein a content of the carbon in the surface layer is 0.004 to 0.5% by mass.

14. The silicon-containing negative electrode active material for nonaqueous electrolyte secondary batteries according to claim 1, wherein said surface layer is formed from an organic compound comprising carbon and titanium or aluminum, which is a coupling agent containing the titanium or aluminum.

15. The silicon-containing negative electrode active material for nonaqueous electrolyte secondary batteries according to claim 2, wherein said surface layer is formed from an organic compound comprising carbon and titanium or aluminum, which is a coupling agent containing the titanium or aluminum.

16. The silicon-containing negative electrode active material for nonaqueous electrolyte secondary batteries according to claim 14, wherein said negative electrode active material particles are subjected to heating at 300 to 500° C.

17. The silicon-containing negative electrode active material for nonaqueous electrolyte secondary batteries according to claim 15, wherein said negative electrode active material particles are subjected to heating at 300 to 500° C.

18. The silicon-containing negative electrode active material for nonaqueous electrolyte secondary batteries according to claim 4, wherein said coupling agent containing titanium or aluminum further has an amino group at a side chain.

19. The negative electrode for nonaqueous electrolyte secondary batteries according to claim 8, wherein the binder is a polyimide.

20. The negative electrode active material for nonaqueous electrolyte secondary batteries according to claim 1, wherein the surface layer containing the carbon and the titanium or aluminum is provided as the outermost layer of the core portion.

21. The negative electrode active material for nonaqueous electrolyte secondary batteries according to claim 1, wherein the total content of iron (Fe), calcium (Ca), phosphorus (P), and oxygen (O) in the negative electrode active material is from 0.1 to 2.5% by mass.

22. The silicon-containing negative electrode active material for nonaqueous electrolyte secondary batteries according to claim 1, wherein the negative electrode active material particles are materials in which the additive elements are solid-solubilized in one of the silicon-containing materials, as a silicon solid solution.

* * * * *